United States Patent
Atmur et al.

(10) Patent No.: US 6,265,078 B1
(45) Date of Patent: Jul. 24, 2001

(54) REDUCING WEAR BETWEEN STRUCTURAL FIBER REINFORCED CERAMIC MATRIX COMPOSITE AUTOMOTIVE ENGINE PARTS IN SLIDING CONTACTING RELATIONSHIP

(75) Inventors: Steven Donald Atmur, Riverside; Thomas Edward Strasser, Corona, both of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/392,921

(22) Filed: Sep. 9, 1999

(51) Int. Cl.[7] ........................................ B32B 9/00
(52) U.S. Cl. .................. 428/446; 428/448; 428/698; 428/699; 428/701; 428/702; 428/908.8
(58) Field of Search ...................... 428/446, 448, 428/689, 698, 699, 701, 702, 908.8

(56) References Cited

U.S. PATENT DOCUMENTS

| | | |
|---|---|---|
| 3,880,969 | 4/1975 | Latos . |
| 4,067,829 | 1/1978 | Garrett . |
| 4,206,598 | 6/1980 | Rao et al. . |
| 4,207,660 | 6/1980 | Rao et al. . |
| 4,233,361 | 11/1980 | Fultz . |
| 4,245,611 | 1/1981 | Mitchell et al. . |
| 4,294,788 | 10/1981 | Laskow et al. . |
| 4,311,541 | 1/1982 | Fultz . |
| 4,341,826 | 7/1982 | Prewo et al. . |
| 4,606,434 | 8/1986 | Vasilow et al. . |
| 4,657,951 | 4/1987 | Takarada et al. . |
| 4,818,732 | 4/1989 | Fox et al. . |
| 4,884,400 | 12/1989 | Tanaka et al. . |
| 4,887,518 | 12/1989 | Hayakawa . |
| 4,928,645 | 5/1990 | Berneburg et al. . |
| 4,972,674 | 11/1990 | Yamada et al. . |
| 4,981,820 | 1/1991 | Renlund et al. . |
| 5,000,136 | 3/1991 | Hansen et al. . |
| 5,018,661 | 5/1991 | Cyb . |
| 5,063,881 | 11/1991 | Kawamura . |
| 5,094,200 | 3/1992 | Fontichiaro . |
| 5,114,262 | 5/1992 | Kojima . |
| 5,126,087 | 6/1992 | Lespade et al. . |
| 5,137,789 | 8/1992 | Kaushal . |
| 5,140,813 | 8/1992 | Whittenberger . |
| 5,180,694 | 1/1993 | Renlund et al. . |
| 5,203,228 | 4/1993 | Miyawaki et al. . |
| 5,211,999 * | 5/1993 | Okada ................................ 428/34.5 |
| 5,223,064 * | 6/1993 | Gadkaree ............................... 156/89 |
| 5,224,335 | 7/1993 | Yoshizaki . |
| 5,224,572 | 7/1993 | Smolen, Jr. et al. . |
| 5,225,283 | 7/1993 | Leung et al. . |
| 5,231,059 | 7/1993 | Leung et al. . |
| 5,244,720 | 9/1993 | Leung et al. . |
| 5,258,084 | 11/1993 | Leung et al. . |
| 5,404,721 | 4/1995 | Hartsock . |
| 5,985,205 * | 11/1999 | Atmur et al. ........................ 264/624 |

* cited by examiner

*Primary Examiner*—Deborah Jones
*Assistant Examiner*—Bryant Young
(74) *Attorney, Agent, or Firm*—Terry J. Anderson; Karl J. Hoch, Jr.

(57) ABSTRACT

Structural ceramic matrix composite material to be employed as automotive engine parts and the like is provided with erosion-resistant qualities in several ways. For one, an erosion-resistant material is applied to the surface as by plasma spraying. The erosion-resistant material can also be mixed with the fibers of the material, particularly near the surface.

4 Claims, 4 Drawing Sheets

REDUCING WEAR BETWEEN STRUCTURAL FIBER REINFORCED CERAMIC MATRIX COMPOSITE AUTOMOTIVE ENGINE PARTS IN SLIDING CONTACTING RELATIONSHIP

BACKGROUND OF THE INVENTION

1. Technical Field

This invention relates to fiber reinforced ceramic matrix composite parts in sliding relationship to one another and, more particularly, to a method of forming a structural fiber reinforced ceramic matrix composite part having improved erosion resistance of its outer surface comprising the steps of forming the part from a pre-ceramic resin having fibers of a woven or non-woven generic fiber system disbursed throughout; firing the part at a temperature and for a time which converts the resin into a ceramic; and, coating the wearing surface with an erosion-resistant material.

2. Background Art

Composite material structures are very popular for various uses. The most widely known such structure is that of so-called "fiberglass" which is used for everything from boats to bathtubs. Such structures are easy to construct employing a mold. For a fiberglass boat, for example, the inside of a female mold is first coated with a parting agent to prevent the final boat from sticking to the mold. The mold is then covered with a color coat of the resin material. The resin material is a viscous liquid to which a hardening agent is added at the time of use. Due to a chemical reaction, the resin turns hard after a short period of time without the need for any further action. Once the color coat is in place, the builder adds layers of a class fiber cloth mat material which are saturated with the liquid resin containing the hardener. The cloth mat containing the resin is rolled and pressed in place to add strength to the final structure. When the resin has hardened, the boat is removed from the mold. At that time, seats and other required parts can be added to the interior of the boat.

More recently, fiber reinforced ceramic matrix composite (FRCMC) structures have been made available for use where due to high temperatures (greater than 400° F.) fiberglass is not suitable. While fiberglass will burn readily, FRCMC, being a ceramic, withstands heats that can destroy even metals. The typical prior art FRCMC structure is made in the manner depicted in FIGS. 1 and 2. A cloth mat of a generic fiber system of, for example, Alumina, Altex, Nextel 312, Nextel 440, Nextel 510, Nextel 550, Silicon Nitride, Silicon Carbide, HPZ, Graphite, Carbon, or Peat is used in place of the glass fiber cloth mat of fiberglass. A pre-ceramic polymer resin such as Silicon-Carboxyl resin sold by Allied Signal under the trade name Blackglas, Alumina Silicate resin (commercially available through Applied Poleramics under the product description CO2), or a cementatous resin modified to emulate polymer composite processing techniques such as Monoaluminum Phosphate (also known as Monoalumino Phosphate) resin is combined with the mat 10. The structure is then heated under pressure to form a dense pre-ceramic "polymer form". The as-formed pre-ceramic shape is then heated for a time to a temperature, as specified by the material suppliers (typically between 1,500° F. and 2,000° F.) which causes the resin 12 to convert into a ceramic material. The resultant FRCMC structure 14, therefore, comprises a ceramic resin 12' containing fibers 16 of the woven or nonwoven cloth mat. There are many methods which can be used to manufacture fiber reinforced ceramic matrix composites. The polymer-derived FRCMC fabrication method described herein is only one such method. Other methods include depositing the matrix around the fiber preform by means of chemical vapor deposition, reaction bonding, hot melting of glasses, and sintering of ceramic powders under extreme pressures and temperatures. The polymer-derived FRCMC manufacturing method is emphasized in this invention because it is the preferred method for the manufacture of the related inventions. Additionally, there are many manufacturing methods available under the Polymer Derived FRCMC fabrication umbrella. Some of these other polymer processing methods include, but are not limited to, resin transfer molding (RTM), short fiber injection, casting, hot pressing, and pultrusion, filament winding (also known as toe placement). Also, the use of a wide range of fiber forms is possible when using polymer process techniques. Fiber can be supplied in rigid or binderized preforms, woven or braided preforms, random mat preforms, fabric, toe (thread), or chopped toe or fabric. Each of the polymer composite manufacturing methods can be used with one or more of the bulk fiber forms .

In a co-pending application entitled HIGH-EFFICIENCY, LOW-POLLUTION ENGINE by the inventors herein filed on even date herewith and assigned to the common assignee of this application, an improved structural FRCMC material is disclosed having high breakage resistance and particular applicability to use for parts in a high temperature internal combustion engine.

To date, the prior art has used FRCMC materials for parts which are not intended to be in a predominately sliding, contacting relationship such as aircraft hot structural components. Attempts by the inventors herein to employ FRCMC structures for parts in a sliding, contacting relationship such as a piston in the cylinder of an automobile resulted in the eventual deterioration of the parts at their interfacing surface. The reason can be seen and understood with reference to FIG. 3. While shown exaggerated for purposes of easy understanding, the fibers 16 of the cloth mat are woven in the usual manner for cloth materials. Thus, there is a bending of the fibers 16 as the "fill" and "warp" fibers pass over and under one another. As the two FRCMC structures 14 are slid over one another in contacting relationship as depicted by the arrow 18, the tips of the fibers 16 at the surface break and chip. The material of the fibers 16 being harder than the ceramic resin 12', the broken and sharp tips of the fibers 16 dig at and eat away the surrounding ceramic resin 12'. And, the disintegration is an increasing process. As more of the fibers 16 are released from the constraints of the surrounding ceramic resin 12' as it is eaten away, there are more broken fibers 16 and longer exposed fibers 16 to dig deeper within the structure, further erode, and ultimately destroy it. Although this wear phenomenon is most prevalent in woven fabric composites, similar and less extensive wear phenomenon of this nature occur in all FRCMCs regardless of fiber architecture.

Wherefore, it is an object of this invention to provide a FRCMC structure regardless of fiber architecture and method of manufacture which will withstand sliding, contacting interaction without erosion thereof.

Other objects and benefits of this invention will become apparent from the description which follows hereinafter when read in conjunction with the drawing figures which accompany it.

SUMMARY OF THE DISCLOSURE

The foregoing objects have been attained by the method of the present invention for forming a structural ceramic matrix composite part having improved erosion resistance of its wear contacting surface comprising the steps of, forming the part of a pre-ceramic polymer resin having fibers of a woven or non-woven generic fiber system disbursed throughout; firing the part at a temperature and for a time which converts the resin into a ceramic; and, coating the outer surface with an erosion-resistant material.

The step of coating the surface with an erosionresistant material may comprise plasma spraying the surface with the erosion-resistant material. And, the erosion-resistant material may comprise Alumina or Mullite.

The step of coating the surface with an erosionresistant material may also comprise mixing the erosionresistant material with fibers of a generic fiber system combined with a pre-ceramic polymer resin fired to form the structural fiber reinforced ceramic matrix composite before the firing thereof.

The surface may be prepared by regularly grooving the surface with a plurality of shallow, close spaced grooves or by grit-blasting the surface to create divots and expose underlying fibers. Grit-blasting is presently the preferred approach.

DETAILED DESCRIPTION OF THE PREFERRED EMBODIMENT

Figure 1:
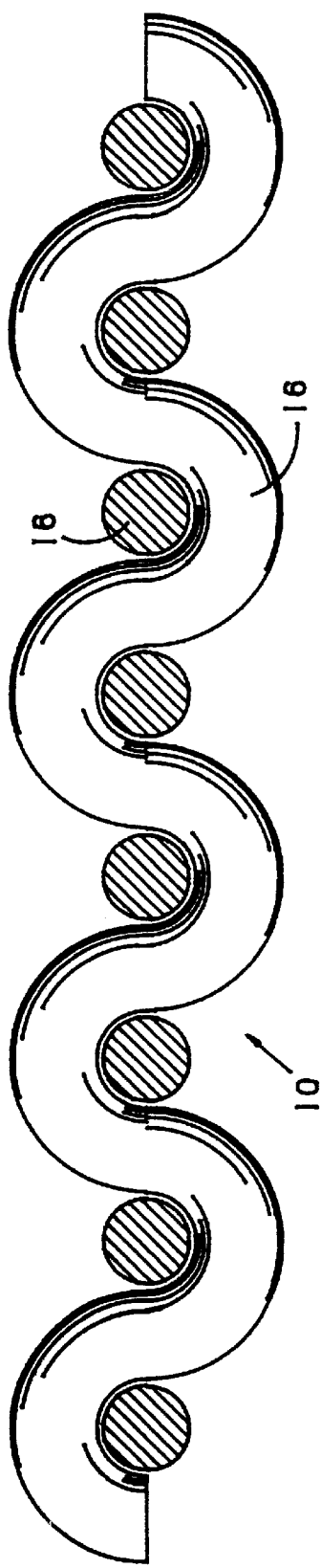
FIG. 1 is a greatly enlarged partially cutaway drawing of a portion of a woven material as employed in prior art composite material structures.
Figure 2:
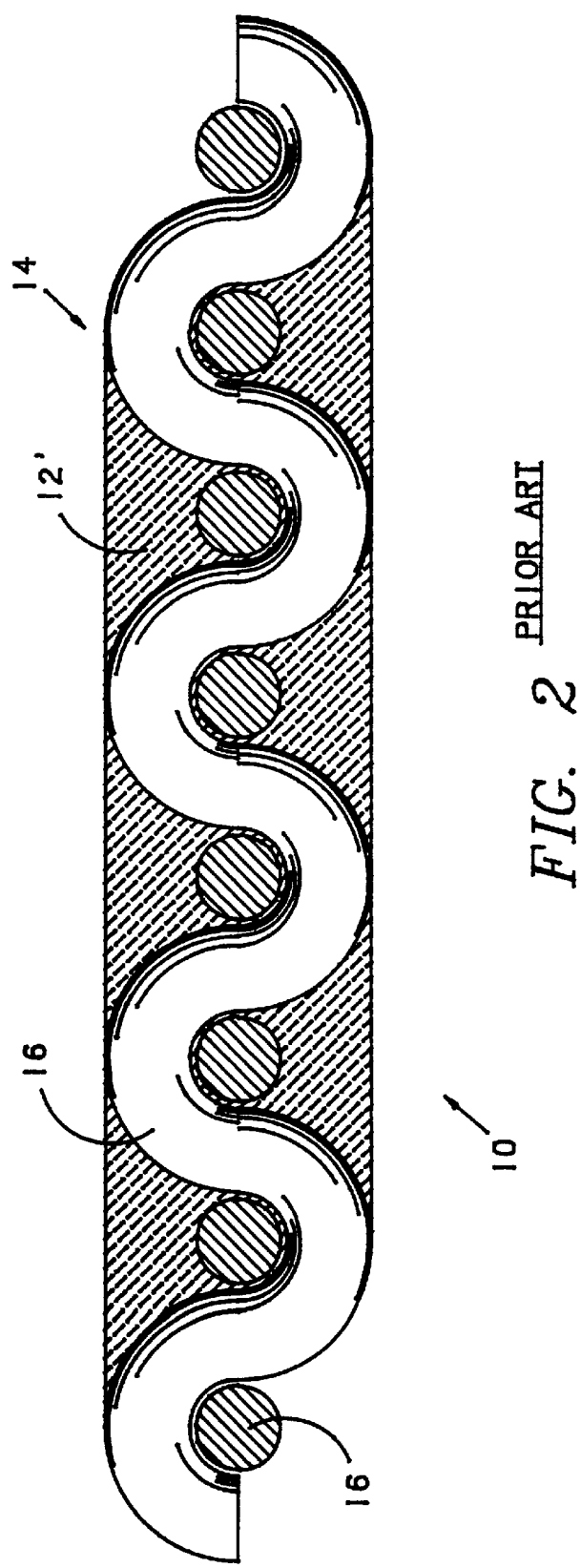
FIG. 2 shows the woven material of FIG. 1 after a ceramic binding material has been added.
Figure 3:
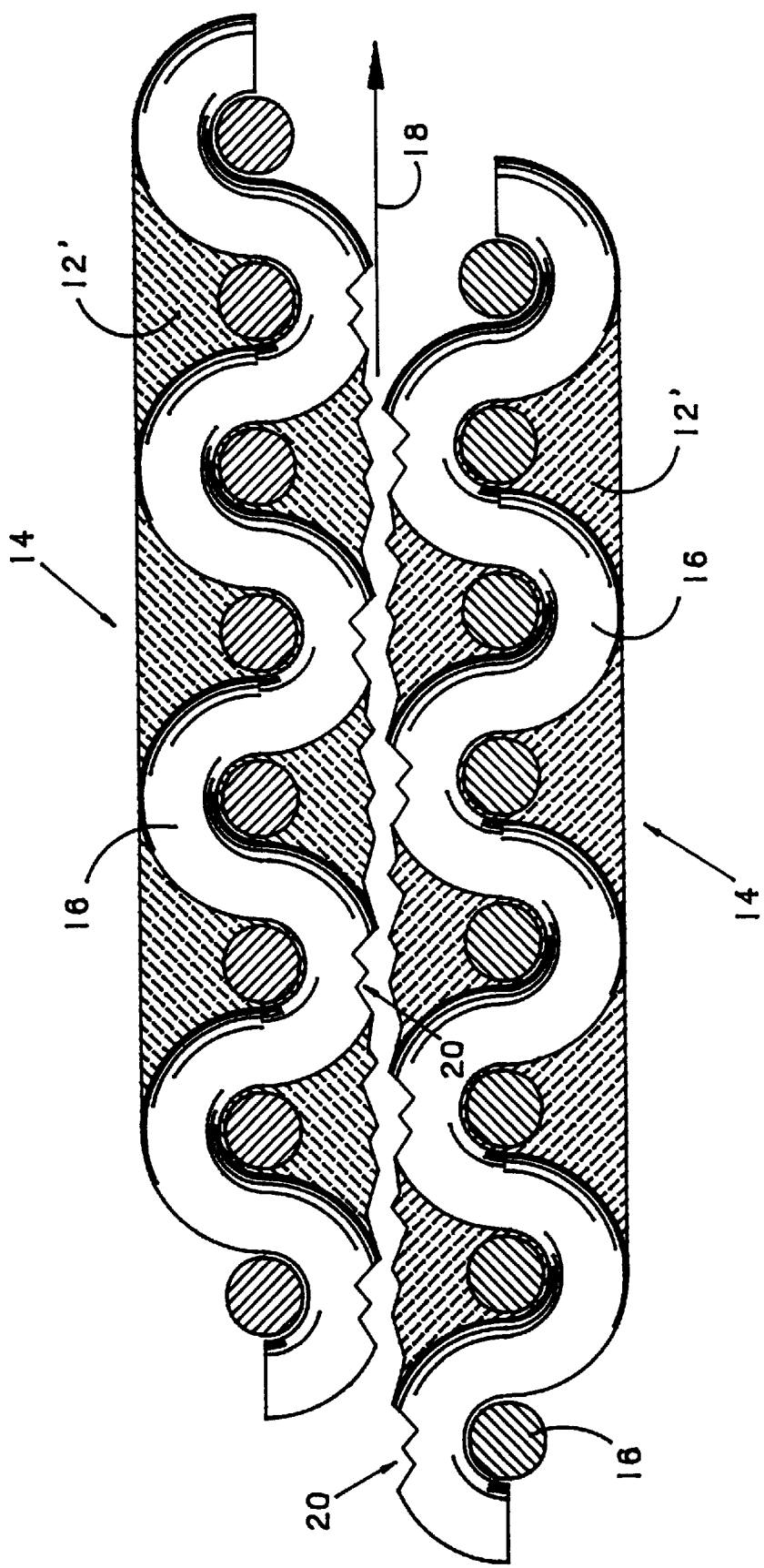
FIG. 3 depicts the problem that occurs when two structures such as those of FIG. 2 are slid together in frictional engagement.
Figure 4:
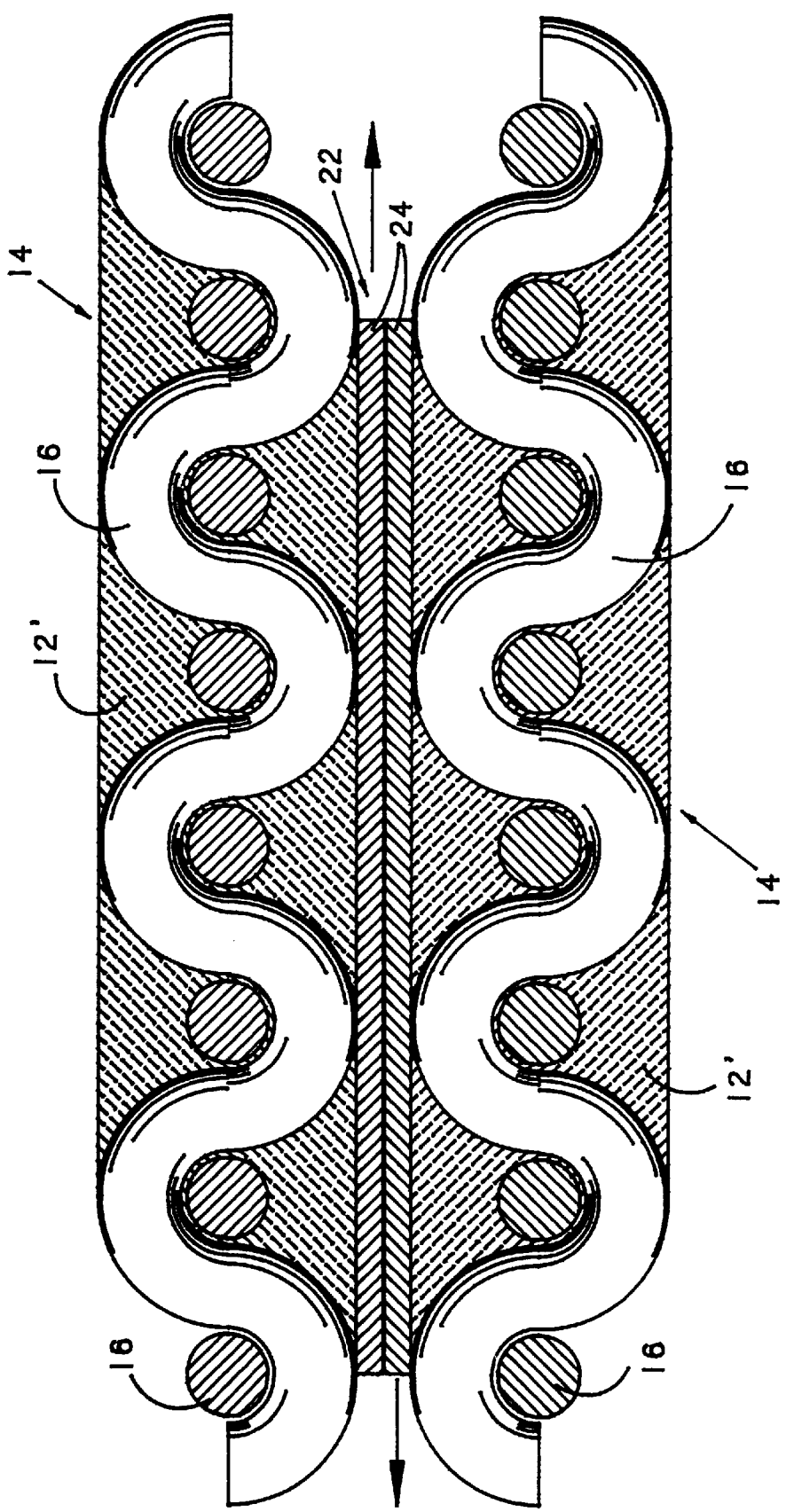
FIG. 4 depicts a first embodiment of the present invention for solving the problem of FIG. 3.

A first embodiment of the present invention employing a woven or non-woven cloth mat 10 of fibers 16 is depicted in FIG. 4. In this embodiment, the contacting surfaces 22 of the structural fiber reinforced ceramic matrix composite component 14 are covered with an erosion-resistant coating 24 which bonds tightly to the wearing surface of the FRCMC structures 14. For this purpose, the erosion-resistant coating 24 preferably comprises Mullite (i.e. Alumina Silicate $Al_2Si_4$), Alumina (i.e. $Al_2O_3$), or equivalent, applied via a plasma spray generally according to techniques well known to those of ordinary skill in the art.

The erosion-resistant coating 24 is applied as follows. Prior to the application of the erosion-resistant coating 24, all holes for spark plugs, valves, wrist pins, etc. are machined. Commercial grade diamond cutting tools are recommended for this purpose. Any other machining as described later is also done at this point. Upon the completion of the machining processes, if any, all sharp edges on the surface of the part are knocked down using diamond paper.

If the part has been machined, it is placed in an oven for a time and temperature adequate to assure "burn off" of any of the cutting lubricants used in the machining process. (Typically 2 Hrs @ 700° F., but is lubricant dependent.)

Figure 5:
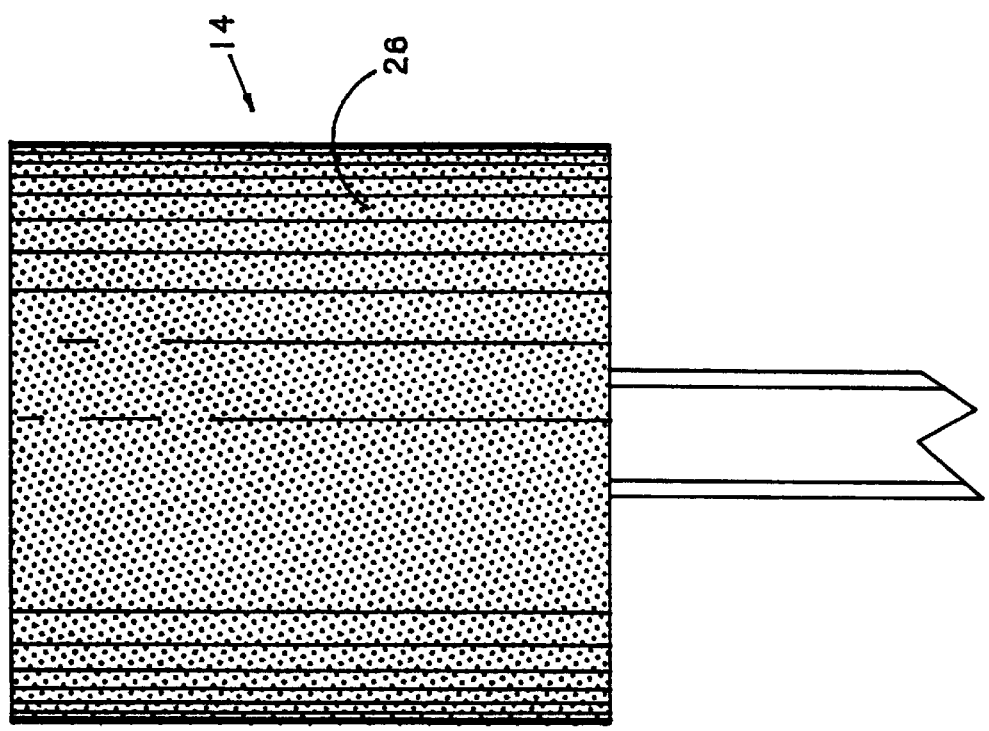
FIG. 5 is a simplified side view drawing of a FRCMC piston wherein the surface thereof has been grit blasted to form a surface which will grip the erosion-resistant coating that is applied thereto.

The key is getting the erosion-resistant coating 24 to bond to the FRCMC structure 14. If the surface of the FRCMC structure 14 is not properly prepared, the erosion-resistant coating 24 can simply flake off and provide no long-term protection. In the preferred approach depicted in FIG. 5, the surface of the FRCMC structure 14 is lightly grit-blasted to form small divots 26 within the ceramic matrix of the FRCMC structure 14. It is also believed that the light grit blasting exposes hairs or whiskers on the exposed fiber of the generic fiber system which the erosion-resistant coating 24 can grip and adhere thereto. Typical grit blasting that has proved successful is 100 grit @ 20 PSI.

Figure 6:
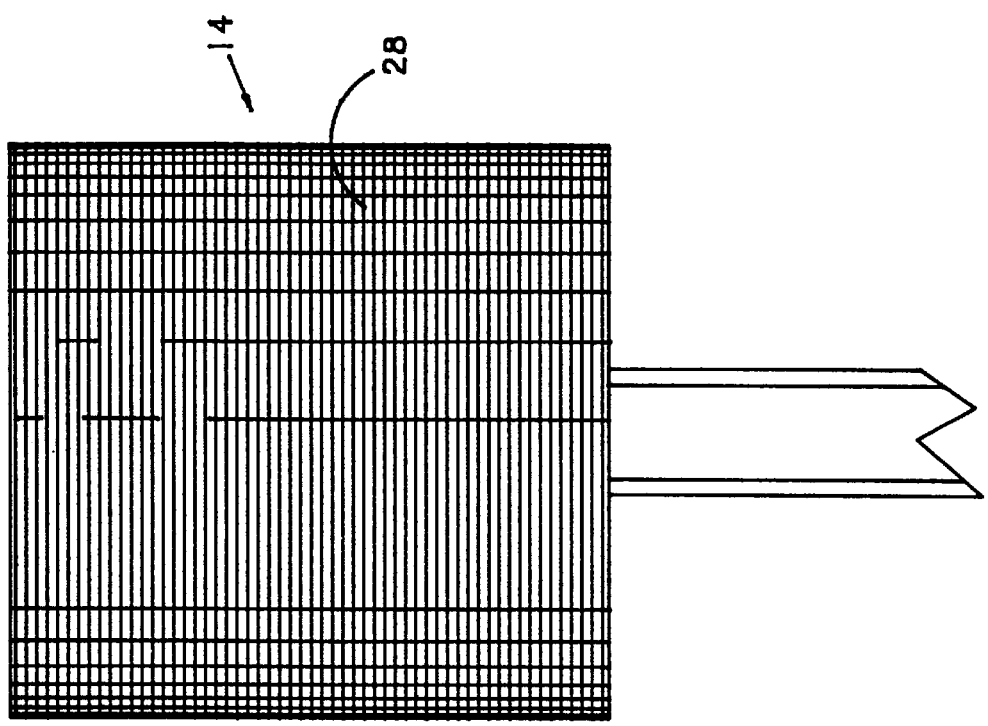
FIG. 6 is a simplified side view drawing of a FRCMC piston wherein the surface thereof has been grooved to form a surface which will grip the erosion-resistant coating that is applied thereto

According to a second possible approach, the surface of the FRCMC structure 14 can be provided with a series of thin, shallow, regularly-spaced grooves 28 similar to fine "threads" of a nut or bolt, as depicted in FIG. 6 which the erosion-resistant coating 24 can mechanical lock into. Essentially, the surface is scored to provide a roughened surface instead of a smooth surface. The depth, width, and spacing of the grooves 28 is not critical and can be determined for each part or component without undue experimentation. In general, the grooves 28 should be closely spaced so as to minimize any large smooth areas of the surface where there is a potential for the erosion-resistant coating 24 to lose its adhesion and flake off. Thus, over-grooving would be preferable to under-grooving the surface with the exception that over-grooving requires the application of additional wear material to provide a smooth wear surface after final grinding. The grooves 28 should be shallow so as to provide a mechanical locking area for the erosion-resistant coating 24 without reducing the structural strength of the underlying FRCMC structure 14 to any appreciable degree.

After surface preparation, the part is cleaned by using clean dry compressed air and then loaded in an appropriate holding fixture for the plasma spray process. Direct air blowers are used to cool the opposite side of the part during the application of the erosion-resistant coating 24.

The plasma sprayed erosion-resistant coating (from the list of possibles in the above-referenced co-pending applications) is then applied using a deposition rate set to 5 grams per minute or more. The holding fixture speed, plasma gun movement rate across the surface, and spray width are set to achieve a barber pole spray pattern with 50% overlap. The spray gun is set relative to the sprayed surface from 0.1 inches to 3 inches away. Particle sizes used for this process range from 170 to 400 mesh. Enough material is applied to allow for finish machining.

After the application of the erosion-resistant coating 24, the coated surface is smoothed out with diamond paper or an appropriate form tool (commercial grade diamond tools recommended) to achieve the final surface contour.

In an completely different approach according to the present invention, the erosion-resistant material in powder form 24 may be dispersed within the matrix material (i.e. the resin) 16 prior to forming the component for improved wear resistance. Alternatively, the plasma sprayed coating can be applied and then the part with the erosion-resistant coating 24 attached can be further reinfiltrated with the pre-ceramic polymer resin and then converted to a ceramic state. The result is an additional toughening of the coating 24 by essentially incorporating the coating into the mixed or combined ceramic matrix composite formed from the combination of the FRCMC and a ceramic matrix reinforced monolithic wear coating integrally bound together by the common ceramic matrix.

Wherefore, having thus described the present invention, what is claimed is:

1. A fiber-reinforced system having mechanical wear erosion resistance, said fiber-reinforced system comprising:

a first structural fiber-reinforced ceramic matrix composite part having a wearing surface;

a second structural fiber-reinforced ceramic matrix composite part having a wearing surface in sliding contact and mating with said wearing surface of said first structural fiber-reinforced ceramic matrix composite part; and mechanical wear erosion-resistant layers, each disposed on said respective wearing surfaces of said first and second parts, wherein said mechanical wear erosion-resistant layers resist mechanical wear erosion of said wearing surfaces due to the sliding contact.

2. The system of claim 1 wherein said mechanical wear erosion-resistant layers are at least one of plasma sprayed mullite and alumina.

3. The system of claim 1 wherein said wearing surfaces of said first and second structural fiber-reinforced ceramic matrix composite parts contain grit-blasted divots exposing fiber hairs thereof on said respective wearing surfaces so that said mechanical wear erosion-resistant layers adhere firmly to said respective wearing surfaces.

4. The system of claim 1 wherein said wearing surfaces of said first and second structural fiber-reinforced ceramic matrix composite parts contain a plurality of thin, shallow, close-spaced grooves so that said mechanical wear erosion-resistant layers adhere firmly to said respective wearing surfaces.

* * * * *